US010479719B2

(12) United States Patent
Barnes et al.

(10) Patent No.: US 10,479,719 B2
(45) Date of Patent: Nov. 19, 2019

(54) APPARATUS AND METHOD FOR CUTTING A GLASS SHEET

(71) Applicant: Corning Incorporated, Corning, NY (US)

(72) Inventors: Monty Eugene Barnes, Corning, NY (US); Dennis William Buckley, Painted Post, NY (US); Ritesh Satish Lakhkar, Painted Post, NY (US)

(73) Assignee: Corning Incorporated, Corning, NY (US)

(*) Notice: Subject to any disclaimer, the term of this patent is extended or adjusted under 35 U.S.C. 154(b) by 113 days.

(21) Appl. No.: 15/507,088

(22) PCT Filed: Aug. 25, 2015

(86) PCT No.: PCT/US2015/046688
§ 371 (c)(1),
(2) Date: Feb. 27, 2017

(87) PCT Pub. No.: WO2016/033040
PCT Pub. Date: Mar. 3, 2016

(65) Prior Publication Data
US 2017/0283300 A1    Oct. 5, 2017

Related U.S. Application Data

(60) Provisional application No. 62/043,039, filed on Aug. 28, 2014.

(51) Int. Cl.
C03B 33/09      (2006.01)
B65G 49/06     (2006.01)
(Continued)

(52) U.S. Cl.
CPC ............ *C03B 33/09* (2013.01); *B65G 49/061* (2013.01); *C03B 33/076* (2013.01);
(Continued)

(58) Field of Classification Search
CPC ..... C03B 33/09; C03B 33/079; C03B 33/091; C03B 33/10; C03B 33/12; B65G 49/061
See application file for complete search history.

(56) References Cited

U.S. PATENT DOCUMENTS

| | | |
|---|---|---|
| 1,661,846 A | 3/1928 | Oakes et al. |
| 1,720,883 A | 7/1929 | Campbell et al. |
| (Continued) | | |

FOREIGN PATENT DOCUMENTS

| | | |
|---|---|---|
| AU | 198782491 | 12/1987 |
| CN | 202415371 | 12/2011 |
| (Continued) | | |

OTHER PUBLICATIONS

English Translation of CN201580046599.5 Office Action dated Mar. 25, 2019; 14 Pages; Chinese Patent Office.
(Continued)

*Primary Examiner* — Omar Flores Sanchez
(74) *Attorney, Agent, or Firm* — Michael A. Hood; Svetlana Z. Short

(57) ABSTRACT

A method of cutting a glass sheet is disclosed. The method comprises heating a heating element to a heat temperature, which in turn heats a glass sheet along a desired cutting line, to a separation temperature. The glass sheet is subjected to non-destructive pressure at an edge on the cutting line. The non-destructive pressure may be applied by a tool with opposed sharp edges so long as the edges do not nick or otherwise score the glass sheet. A diagonal cutter may be utilized as the sharp-edged tool. After an adequate amount of heating time, the glass sheet will achieve the separation temperature and spontaneously separate along the heated cutting line.

20 Claims, 3 Drawing Sheets

(51) Int. Cl.
*C03B 33/07* (2006.01)
*C03B 33/10* (2006.01)
*C03B 33/12* (2006.01)

(52) U.S. Cl.
CPC ............ *C03B 33/091* (2013.01); *C03B 33/10* (2013.01); *C03B 33/12* (2013.01)

(56) References Cited

U.S. PATENT DOCUMENTS

| | | | |
|---|---|---|---|
| 1,738,228 A | 12/1929 | Campbell et al. | |
| 1,744,045 A | 1/1930 | Halbach | |
| 1,887,974 A | 11/1932 | Barrow | |
| 2,146,373 A | 2/1939 | Keier | |
| 2,169,687 A | 8/1939 | Fowler et al. | |
| 2,283,251 A | 5/1942 | Gunther | |
| 2,554,884 A | 5/1951 | Smith et al. | |
| 2,584,851 A | 5/1952 | Dunipace | |
| 3,587,956 A | 6/1971 | Waldemar et al. | |
| 3,737,294 A | 6/1973 | Dumbaugh | |
| 3,790,362 A | 5/1974 | Dahlberg et al. | |
| 3,849,097 A | 11/1974 | Giffen | |
| 3,931,438 A | 1/1976 | Beall et al. | |
| 4,090,420 A * | 5/1978 | Insolio ................ | B25B 7/00 225/103 |
| 4,102,664 A | 7/1978 | Dumbaugh | |
| 4,109,840 A | 8/1978 | Oelke et al. | |
| 4,214,886 A | 7/1980 | Shay et al. | |
| 4,232,809 A | 11/1980 | Boehm et al. | |
| 4,361,130 A * | 11/1982 | Maglia ................. | C03B 33/12 125/36 |
| 5,342,426 A | 8/1994 | Dumbaugh | |
| 5,559,060 A | 9/1996 | Dumbaugh | |
| 6,944,953 B2 * | 9/2005 | Momosaki ............ | B26B 17/006 30/178 |
| 6,962,279 B1 * | 11/2005 | Marek ................. | C03B 33/03 225/103 |
| 7,002,101 B2 | 2/2006 | Cuvelier | |
| 7,201,965 B2 | 1/2007 | Gulati | |
| 7,514,149 B2 | 4/2009 | Bocko et al. | |
| 7,820,941 B2 | 10/2010 | Brown et al. | |
| 8,007,913 B2 | 8/2011 | Coppola | |
| 8,011,207 B2 | 9/2011 | Abramov et al. | |
| 8,051,679 B2 | 11/2011 | Abramov et al. | |
| 8,327,666 B2 | 12/2012 | Harvey et al. | |
| 8,341,976 B2 | 1/2013 | Dejneks et al. | |
| 8,584,490 B2 | 11/2013 | Garner et al. | |
| 2005/0258135 A1 | 11/2005 | Ishikawa et al. | |
| 2008/0236199 A1 | 10/2008 | Sklyarevich et al. | |
| 2011/0049765 A1 | 3/2011 | Li et al. | |
| 2011/0127244 A1 | 6/2011 | Li | |
| 2012/0024928 A1 | 2/2012 | Matsumoto et al. | |
| 2013/0125589 A1 | 5/2013 | Dannoux et al. | |
| 2013/0266757 A1 | 10/2013 | Giron et al. | |
| 2013/0291598 A1 | 11/2013 | Saito et al. | |
| 2013/0323469 A1 | 12/2013 | Abramov et al. | |
| 2014/0138420 A1 | 5/2014 | Peng et al. | |

FOREIGN PATENT DOCUMENTS

| | | |
|---|---|---|
| EP | 1158343 | 2/2001 |
| EP | 1604794 | 12/2005 |
| EP | 2316797 | 12/2015 |
| GB | 1258136 | 12/1971 |
| JP | 14175636 | 11/2008 |
| JP | 2013203631 | 10/2013 |
| JP | 201473961 | 4/2014 |
| TW | 201313639 | 4/2013 |
| WO | 2010048263 | 4/2010 |
| WO | 2013130700 A1 | 9/2013 |
| WO | 2013130718 A1 | 9/2013 |

OTHER PUBLICATIONS

Notification of Transmittal of The International Search Report and Written Opinion of the International Searching Authority, or the Declaration, dated Aug. 25, 2015, pp. 1-14, International Application No. PCT/US2015/046688 European Patent Office, The Netherlands.

* cited by examiner

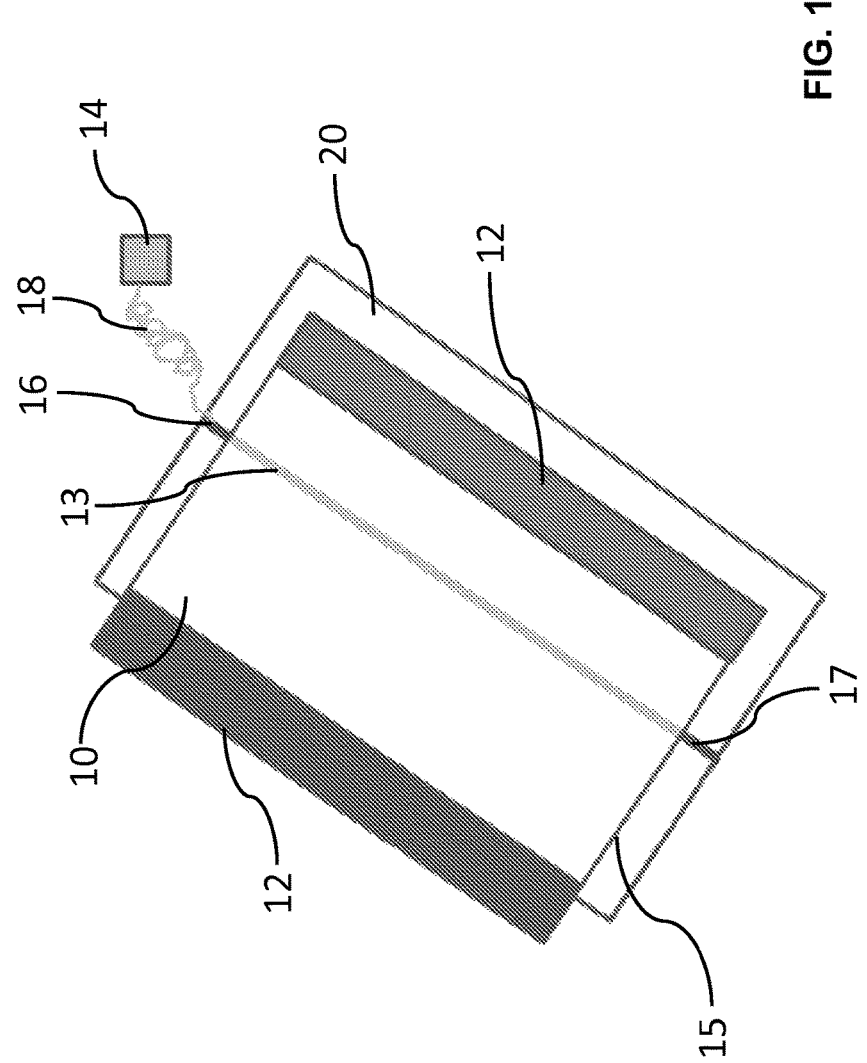

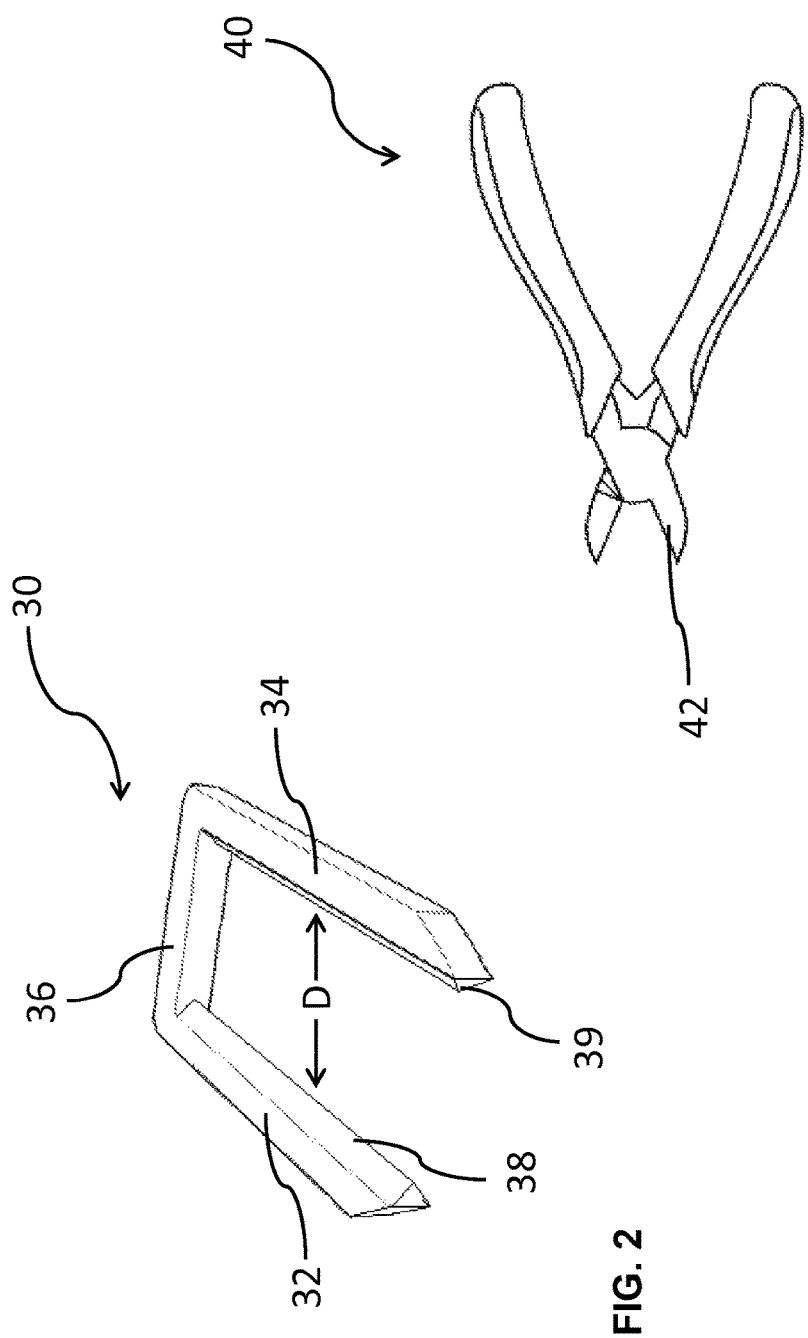

APPARATUS AND METHOD FOR CUTTING A GLASS SHEET

This application claims the benefit of priority to International Application No. PCT/US2015/046688, filed Aug. 25, 2015, which claims the benefit of priority to U.S. Provisional Application No. 62/043,039, filed Aug. 28, 2014, the content of each of which is incorporated herein by reference in its entirety.

BACKGROUND

1. Field

The present disclosure generally relates to apparatus and methods for thermal cutting of glass sheets and, more specifically, to apparatus and methods for thermal cutting of glass sheets by applying tool non-destructive pressure.

2. Technical Background

Glass sheets have previously been cut in a number of ways such as scoring followed by breaking and diamond saw cutting. Such mechanical methods can be expensive due to costs of the mechanical cutting devices.

Another method includes thermally severing glass and involves nicking one edge of the glass sheet and then subjecting the glass sheet to radiant heat to propagate the crack. Such a method can result in an inaccurate cutting line. Another method of thermally severing glass requires continuous contact between the glass sheet and the heat source. Such a method can be expensive due to the equipment required to ensure continuous contact along the cutting line.

SUMMARY

According to one embodiment, a method of cutting a glass sheet comprises heating a heating element to a heat temperature, which in turn heats a glass sheet along a desired cutting line to a separation temperature. The heat temperature is greater than the separation temperature. The glass sheet is subjected to non-destructive pressure at an edge on the cutting line. The non-destructive pressure may be applied by a tool with opposed sharp edges so long as the edges do not nick or otherwise score the glass sheet. A diagonal cutter may be utilized as the sharp-edged tool. After an adequate amount of heating time, the glass sheet will spontaneously separate along the heated cutting line.

Additional features and advantages of the methods for cutting laminate strengthened glass sheets described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate one or more embodiments described herein, and together with the description serve to explain the principles and operations of the claimed subject matter.

BRIEF DESCRIPTION OF THE DRAWINGS

FIG. 1 depicts one embodiment of a glass cutting apparatus for use in the method of the present disclosure.

FIG. 2 is a perspective view of one embodiment of a sharp-edged tool.

FIG. 3 is an elevated view of one embodiment of a pair of diagonal cutters.

DETAILED DESCRIPTION

Figure 5:
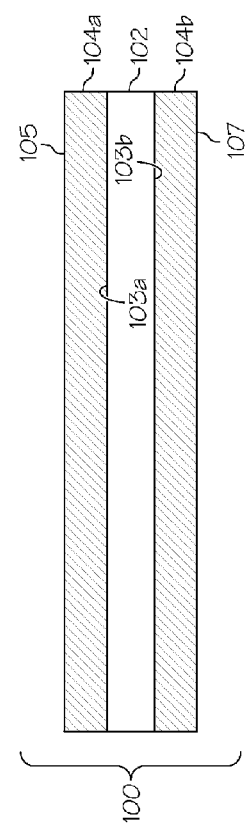
FIG. 5 schematically depicts one embodiment of a fusion draw process for making the laminated glass sheet of FIG. 4.

Reference will now be made in detail to embodiments of apparatus and methods for cutting glass sheets, examples of which are illustrated in the accompanying drawings.

In various embodiments, a method of cutting a glass sheet comprises heating a heating element to a heat temperature; the heat temperature is above the temperature to which the glass sheet must be heated for separation, referred to as the separation temperature. The glass sheet may be positioned immediately adjacent to the heating element. The glass sheet has a cutting line, representing the location on the glass sheet where the cut is desired, and an edge. The cutting line and the edge intersect at a point. The glass sheet may be positioned such that the cutting line and the edge are immediately adjacent to the heating element and at least a portion of the cutting line is in direct contact with the heating element. While the glass sheet is held in position adjacent to the heating element, the glass sheet is held or engaged at the point with a sharp-edged tool. The sharp-edged tool comprises a sharp edge. For example, the sharp edge comprises two opposed sharp edges. The sharp-edged tool lightly holds the glass sheet such that the glass sheet is not nicked or otherwise damaged, and is positioned such that the sharp edge of the sharp-edged tool is aligned with the cutting line. The glass sheet is maintained in position immediately adjacent to the heating element to permit the glass sheet to achieve a separation temperature, whereby the glass sheet separates along the cutting line. Thus, the separation is achieved by engaging the sheet with the sharp-edged tool during heating, and without nicking, scoring, or otherwise forming a defect in the glass sheet. Additionally, or alternatively, the separation is achieved without relative motion between the glass sheet and the sharp-edged tool. For example, the separation is achieved without moving the sharp-edged tool inward toward a center of the glass sheet after initial engagement with the glass sheet (e.g., without bringing opposing sharp edges of the sharp-edged tool together toward one another to cut into the glass sheet) and/or without running the sharp-edged tool across a surface of the glass sheet (e.g., without scribing the glass sheet with the sharp-edged tool). Additionally, or alternatively, the separation is achieved without bending the glass sheet to induce the separation.

FIG. 1 depicts one embodiment of a glass cutting apparatus for cutting a glass sheet. A glass sheet 10 may include knurled edge portions 12 as a result of the glass manufacturing process. For example, the knurled edge portions 12 comprise beads extending longitudinally along one or more edges of the glass sheet 10 and being thicker than a central region of the glass sheet. Additionally, or alternatively, the knurled edge portions 12 comprise roughened or uneven surfaces, which may result from engagement of the glass sheet 10 by one or more pulling rollers during the forming process. The glass sheet 10 may be designated with a cutting line 13 which represents the location on the glass sheet 10 where a separation is desired. As will be understood, the cutting line 13 may not be physically present on the glass sheet 10, but merely represents the location where cutting is desired. In some embodiments, the cutting line 13 extends longitudinally along the glass sheet 10 (e.g., substantially parallel to the knurled edge portions 12) as shown in FIG. 1. Such a configuration can enable removal of the knurled edge portions 12 from the glass sheet. In other embodiments, the cutting line can extend transversely along the glass sheet (e.g., perpendicular to the knurled edge portions 12) or in another suitable direction (e.g., at an oblique angle to the knurled edge portions 12). The glass sheet also includes an edge 15. A point 17 represents the location where the edge 15 and the cutting line 13 intersect.

The glass sheet 10 is positioned adjacent to a heating element 16 such that the cutting line 13 and the heating element 16 are immediately adjacent to each other. Thus, the heating element 16 is aligned with the cutting line 13 as shown in FIG. 1. The glass sheet 10 need not be in continuous contact with the heating element 16. For example, the glass sheet 10 is positioned immediately adjacent to the heating element 16 such that the heating element is spaced from the glass sheet by a distance of at most about 100 mm, at most about 50 mm, at most about 25 mm, at most about 10 mm, at most about 5 mm, or at most about 1 mm along the cutting line. In some embodiments, at least a portion of the glass sheet 10 along the cutting line 13 is in contact with the heating element 16. For example, the point 17 and a portion of the cutting line 13 immediately adjacent the point 17 are in contact with the heating element 16. The heating element 16 may heat the glass sheet 10 by conduction, convection, and/or radiation.

The heating element 16 selectively or preferentially heats the glass sheet 10 along the cutting line 13. For example, the heating element 16 heats a region of the glass sheet 10 along the cutting line 13 to form a heated region without substantially heating remote regions of the glass sheet spaced away from the cutting line. In some non-limiting embodiments, to achieve such localized heating, the heating element 16 may be very narrow, for example less than or equal to about 3 mm wide. In some embodiments, the heated region of the glass sheet comprises the cutting line 13 and extends a minimal distance to either side of the cutting line 13. The width of the heated region will depend on the type and thickness of glass sheet that is being cut, which affects the time necessary to achieve the separation temperature.

In some embodiments, the heating element 16 heats the glass sheet 10 asymmetrically to cause a thermal gradient to develop through the glass sheet 10 in the thickness direction. For example, the heating element 16 heats one surface of the glass sheet 10 (e.g., the surface immediately adjacent to the heating element) without directly heating the opposing surface of the glass sheet. Thus, the heated region of the glass sheet is hotter at the surface adjacent to the heating element 16 than at the opposing surface positioned away from the heating element.

The heat temperature to which the heating element 16 is heated may depend on the composition of the glass sheet 10 because the heat temperature should be above the separation temperature, which will vary depending on the glass sheet. Alternatively, the heat temperature to which the heating element 16 is heated may be a designated temperature, such as about 320° C., which typically will be above the separation temperature, or higher, and the time for cutting of the glass sheet 10 may vary depending on the composition of the glass sheet 10.

The heating element 16 comprises a suitable heating device that generates heat to heat the cutting line 13 of the glass sheet 10. For example, the heating element 16 comprises a heated wire (e.g., a nichrome wire), a heated rod (e.g., a calrod), a heat tape, a heat plate, a torch or bank of torches, a laser or bank of lasers, or another suitable heating device. In some embodiments, the heating element 16 comprises a heat tape connected by electric wiring 18 to a power supply 14 as shown in FIG. 1. A heat tape can provide the required heating and is relatively inexpensive. Using a heat tape eliminates the substantial costs associated with other types of glass cutting equipment, such as lasers or mechanical cutting devices.

A support 20 may support the glass sheet 10 in a suitable position (e.g., horizontal, vertical, or an intermediate angle, as convenient). In some embodiments, the heating element 16 is embedded in the support 20 such that the heating element 16 is at least partially coterminous with the surface of the support 20 that supports the glass sheet 10. Thus, the glass sheet 10 may be fastened to the support 20 for ease of handling.

FIG. 2 is a perspective view of one embodiment of a sharp-edged tool 30. The sharp edged-tool 30 may include a first leg 32, a second leg 34, and a crossbar 36. The legs 32, 34, each include a blade 38, 39, respectively, which provides a sharp edge to each of the legs 32, 34. The distance, D, between the first leg 32 and the second leg 34 may be slightly less than the thickness of the glass sheet 10 (FIG. 1) to be cut. The first leg 32 and the second leg 34 may be separated slightly so that the glass sheet 10 at the point 17 may be inserted into the sharp-edged tool 30 with the blades 38, 39 lightly contacting the glass sheet 10. The crossbar 36 may provide resistance, biasing the first leg 32 and the second leg 34 to their non-separated position, thereby lightly holding the extreme edge of the glass sheet 10 at the point 17. The sharp-edged tool 30 holds the glass sheet 30 lightly so that the glass sheet 10 is not damaged or nicked. For example, the blades 38, 39 of the sharp-edged tool 30 engage opposing surfaces of the glass sheet 10 to gently squeeze the glass sheet between the blades without damaging the glass sheet (e.g., without scoring, scratching, cutting, nicking, or otherwise forming a defect in the surfaces and/or edges of the glass sheet). In some embodiments, engaging the glass sheet 10 with the sharp-edged tool 30 without forming a defect in the glass sheet comprises engaging the glass sheet such that any crack formed in the surface of the glass sheet by such engagement extends at most about 2 μm, at most about 1 μm, or at most about 0.5 μm from the surface into the glass sheet. Engaging the glass sheet with the sharp edges of the sharp-edged tool can aid in concentrating stresses within the glass sheet along the cutting line so that the glass sheet separates along the cutting line upon reaching the separation temperature. Additionally, or alternatively, avoiding forming a defect in the glass sheet can help to prevent uneven cracking or breaking of the glass sheet. For example, such uneven cracking or breaking can be propagated from a nick or score in the glass sheet before the glass sheet reaches the separation temperature.

FIG. 3 is an elevated view of one embodiment of a pair of diagonal cutters. In some embodiments, a pair of diagonal cutters 40 may be used as the sharp-edged tool. The pair of diagonal cutters 40 includes sharp-edged jaws 42. The pair of diagonal cutters 40 can engage the glass sheet 10 as described with reference to the sharp-edged tool 30, which may provide the proper placement sufficient to generate the initial crack and permit the glass sheet to separate along the area that was preferentially heated by the heating element 16.

The apparatus and methods described herein can be used for cutting a suitable glass sheet including, for example, a single layer glass sheet or a laminate glass sheet, which can be difficult to cut due to stresses present in the core and cladding layers. The glass sheet can be substantially planar (e.g., a flat glass sheet) or non-planar (e.g., a curved or shaped glass sheet). As described above, when the glass sheet 10 is heated by the heating element 16 while the point 17 of the glass sheet 10 is lightly held by a sharp-edged tool 30 or a pair of diagonal cutters 40, the glass sheet 10 will spontaneously separate at the cutting line 13. The heating element 16 may be heated to an appropriate temperature, such as about 320° C. Within about 5-30 seconds of time the glass sheet 10 will spontaneously separate along the preferentially heated area or cutting line 13. The time needed for the separation of the glass will be dictated by the characteristics of the glass and will vary with the type of glass, from about 5 to 30 seconds depending on glass ratio and thickness.

Figure 4:
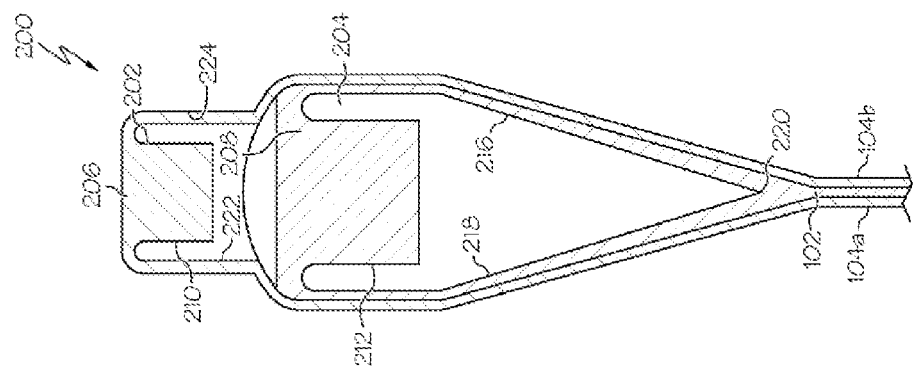
FIG. 4 schematically depicts a cross section of a laminated glass sheet according to one or more embodiments shown and described herein.

Regarding laminate glass sheets, referring now to FIG. 4, one embodiment of a laminated glass sheet 100 is schematically depicted in cross section. The laminated glass sheet 100 generally comprises a glass core layer 102 and a pair of glass cladding layers 104a, 104b. It is noted that, in other embodiments, the laminated glass sheet may include only one glass cladding layer, thereby providing a two-layer sheet. In other embodiments, the laminated glass sheet may include multiple core and/or cladding layers, thereby providing a four-, five-, or more-layer sheet.

Still referring to FIG. 4, the glass core layer 102 generally comprises a first surface portion 103a and a second surface portion 103b, which is opposed to the first surface portion 103a. A first glass cladding layer 104a is fused to the first surface portion 103a of the glass core layer 102 and a second glass cladding layer 104b is fused to the second surface portion 103b of the glass core layer 102. The glass cladding layers 104a, 104b are fused to the glass core layer 102 without any additional materials, such as adhesives, coating layers or any non-glass material added or configured to adhere the respective cladding layers to the core layer, disposed between the glass core layer 102 and the glass cladding layers 104a, 104b. Thus, the first glass cladding layer 104a and/or the second glass cladding layer 104b are fused directly to the glass core layer 102 or are directly adjacent to the glass core layer 102. In some embodiments, the laminated glass sheet comprises one or more intermediate layers disposed between the glass core layer and the first glass cladding layer and/or between the glass core layer and the second glass cladding layer. For example, the intermediate layers comprise intermediate glass layers and/or diffusion layers formed at the interface of the glass core layer and the glass cladding layer. The diffusion layer can comprise a blended region comprising components of each layer adjacent to the diffusion layer. In some embodiments, the laminated glass sheet comprises a glass-glass laminate (e.g., an in situ fused multilayer glass-glass laminate) in which the interfaces between directly adjacent glass layers are glass-glass interfaces.

In some embodiments, the glass core layer 102 is formed from a first glass composition having an average core coefficient of thermal expansion $CTE_{core}$ and the glass cladding layers 104a, 104b are formed from a second, different glass composition, which has an average cladding coefficient of thermal expansion $CTE_{cladding}$. The term "CTE," as used herein, refers to the coefficient of thermal expansion of the glass composition averaged over a temperature range from about 20° C. to about 300° C. The $CTE_{core}$ may be greater than $CTE_{cladding}$, which results in the glass cladding layers 104a, 104b being compressively stressed without being ion exchanged or thermally tempered. Thus, the laminated glass sheet comprises a laminated strengthened glass sheet. In other embodiments, the $CTE_{cladding}$ may be greater than $CTE_{core}$, which results in the core layer 102 being compressively stressed.

In some embodiments, the laminated glass sheet 100 may be formed by a laminate fusion draw or fusion lamination process such as the process described in U.S. Pat. No. 4,214,886, which is incorporated herein by reference.

Referring to FIG. 5 by way of example, a laminate fusion draw apparatus 200 for forming a laminated glass article comprises an upper isopipe or overflow distributor 202, which is positioned over a lower isopipe or overflow distributor 204. The upper overflow distributor 202 comprises a trough 210 into which a molten glass cladding composition 206 is fed from a melter (not shown). Similarly, the lower overflow distributor 204 comprises a trough 212 into which a molten glass core composition 208 is fed from a melter (not shown). In the embodiments, described herein, the molten glass core composition 208 has an average coefficient of thermal expansion $CTE_{core}$ which is greater than the average coefficient of thermal expansion $CTE_{cladding}$ of the molten glass cladding composition 206.

As the molten glass core composition 208 fills the trough 212, the molten glass core composition 208 overflows the trough 212 and flows over the outer forming surfaces 216, 218 of the lower overflow distributor 204. The outer forming surfaces 216, 218 of the lower overflow distributor 204 converge at a root or draw line 220. Accordingly, the molten glass core composition 208 flowing over the outer forming surfaces 216, 218 rejoins at the draw line 220 of the lower overflow distributor 204, thereby forming a glass core layer 102 of a laminated glass article.

Simultaneously, the molten glass cladding composition 206 overflows the trough 210 formed in the upper overflow distributor 202 and flows over outer forming surfaces 222, 224 of the upper overflow distributor 202. The molten glass cladding composition 206 is outwardly deflected by the upper overflow distributor 202, such that the molten glass cladding composition 206 flows around the lower overflow distributor 204 and contacts the molten glass core composition 208 flowing over the outer forming surfaces 216, 218 of the lower overflow distributor, fusing to the molten glass core composition and forming glass cladding layers 104a, 104b around the glass core layer 102.

In some embodiments, the molten glass core composition 208 in the viscous state is contacted with the molten glass cladding composition 206 in the viscous state to form the laminated glass sheet. In some of such embodiments, a glass ribbon travels away from the draw line 220 of the lower overflow distributor 204 as shown in FIG. 5. The glass ribbon can be drawn away from the lower overflow distributor 204 by a suitable drawing mechanism including, for example, gravity and/or pulling rollers. The glass ribbon cools as it travels away from the lower overflow distributor 204. The glass ribbon is severed to separate a glass pane from the glass ribbon. Thus, the glass pane is cut from the glass ribbon. In some embodiments, the glass sheet comprises the glass ribbon. In other embodiments, the glass sheet comprises the glass pane cut from the glass ribbon.

In some embodiments, the glass ribbon is severed as described herein. For example, the heating element 16, the support 20, and/or the sharp-edged tool 30 or diagonal cutters 40 are configured to move with the glass ribbon to sever the glass ribbon along the cutting line 13 as described herein. By moving the heating element 16 with the glass ribbon, the heating element can be maintained adjacent to the cutting line 13 to preferentially heat the region of the glass ribbon as described herein. Similarly, by moving the support 20 and/or the sharp-edged tool 30 or diagonal cutters 40 with the glass ribbon, the moving ribbon can be severed along the cutting line 13. In some embodiments, the cutting line 13 extends transversely across the width of the moving ribbon such that severing the moving ribbon along the cutting line cuts a pane from the ribbon. Additionally, or alternatively, the cutting line 13 extends longitudinally along the length of the moving ribbon (e.g., to enable removal of the beads from the moving ribbon). In various embodiments, the cutting methods described herein can be used to sever a glass ribbon during a forming operation or a glass pane as a post processing step following a forming operation.

As noted hereinabove, the molten glass core composition 208 may have an average coefficient of thermal expansion $CTE_{core}$ that is greater than the average cladding coefficient of thermal expansion $CTE_{cladding}$ of the molten glass cladding composition 206. Accordingly, as the glass core layer 102 and the glass cladding layers 104a, 104b cool, the difference in the coefficients of thermal expansion of the glass core layer 102 and the glass cladding layers 104a, 104b cause compressive stresses to develop in the glass cladding layers 104a, 104b. The compressive stress increases the strength of the resulting laminated glass article without an ion-exchange treatment or thermal tempering treatment. Glass compositions for the glass core layer 102 and the glass cladding layers 104a, 104b may include, but are not limited to, the glass compositions described in PCT Pat. Publication No. WO 2013/130700 entitled "High CTE Potassium Borosilicate Core Glasses and Glass Articles Comprising the Same", and PCT Pat. Publication No. WO 2013/130718 entitled "Low CTE Alkali-Free Boroaluminosilicate Glass Compositions and Glass Articles Comprising the Same", both of which are assigned to Corning Incorporated and incorporated herein by reference in their entireties.

The methods of the present disclosure are suitable for cutting a laminated glass sheet 100 as described above, even though conventional cutting methods may not be adequate for cutting such a laminate glass sheet 100 due to the stresses present in the core layer 102 and the pair of glass cladding layers 104a, 104b.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of cutting a glass sheet, the method comprising:
heating a heating element to a heat temperature;
positioning the glass sheet immediately adjacent to the heating element such that a cutting line of the glass sheet is aligned with the heating element;
engaging the glass sheet with a sharp-edged tool without forming a defect in the glass sheet; and
maintaining the glass sheet in position immediately adjacent to the heating element and engaged by the sharp-edged tool without relative motion between the glass sheet and the sharp-edged tool after engaging the glass sheet with the sharp-edged tool, whereby the glass sheet separates along the cutting line.

2. The method of claim 1, wherein the maintaining step comprises applying heat asymmetrically to the glass sheet with the heating element along the cutting line.

3. The method of claim 2, wherein the applying heat asymmetrically comprises applying heat directly to a first surface of the glass sheet immediately adjacent to the heating element without applying heat directly to a second surface of the glass sheet opposite the first surface.

4. The method of claim 1, wherein the glass sheet comprises a laminated glass sheet.

5. The method of claim 4, wherein the laminated glass sheet comprises a core layer positioned between a first cladding layer and a second cladding layer, and a coefficient of thermal expansion (CTE) of the core layer is greater than a CTE of each of the first cladding layer and the second cladding layer.

6. The method of claim 1, wherein, during the positioning step, at least a portion of the cutting line is in direct contact with the heating element.

7. The method of claim 1, wherein the sharp-edged tool comprises two opposed sharp edges, and the engaging step comprises engaging the glass sheet between the two opposed sharp edges of the sharp-edged tool with each of the two opposed sharp edges aligned with the cutting line.

8. The method of claim 1, wherein the engaging step comprises engaging the glass sheet at an intersection of the cutting line with an edge of the glass sheet.

9. A method of cutting a glass sheet, the method comprising:
heating a heating element to a heat temperature;
suspending the glass sheet immediately adjacent to the heating element, the glass sheet comprising a cutting line and an edge, the cutting line intersecting the edge; the glass sheet positioned such that the cutting line and the edge are immediately adjacent to the heating element and at least a portion of the cutting line is in direct contact with the heating element;
holding the glass sheet at the edge adjacent to the heating element with a sharp-edged tool, the sharp-edged tool comprising two opposed sharp edges, the sharp-edged tool engaging the glass sheet without nicking the glass sheet and being positioned such that the two sharp edges align with the cutting line;
maintaining the glass sheet in position immediately adjacent to the heating element to permit the glass sheet to achieve a separation temperature and applying heat asymmetrically to the glass sheet with the heating element along the cutting line, whereby the glass sheet separates along the cutting line.

10. The method of claim 9 wherein the heating step comprises positioning the heating element substantially horizontally and the suspending step comprises suspending the glass sheet immediately above the heating element.

11. The method of claim 9 wherein the heating step comprises positioning the heating element substantially horizontally and the suspending step comprises suspending the glass sheet immediately below the heating element.

12. The method of claim 9 wherein the heating step comprises positioning the heating element substantially vertically and the suspending step comprises suspending the glass sheet immediately vertically spaced with the heating element.

13. The method of claim 9 wherein the sharp-edged tool comprises a sharp-edged pliers.

14. The method of claim 13 wherein the sharp-edged pliers comprises a diagonal cutter.

15. The method of claim 9 wherein the cutting line has a length and the entire length of the cutting line is in direct contact with the heating element.

16. The method of claim 9 wherein the glass sheet is a laminated glass sheet.

17. An apparatus for cutting a glass sheet, the apparatus comprising:
    a heating element positionable immediately adjacent to the glass sheet and in alignment with a cutting line of the glass sheet; and
    a sharp-edged tool comprising a sharp edge engageable with the glass sheet along the cutting line without forming a defect in the glass sheet;
    wherein applying heat to the cutting line of the glass sheet with the heating element while engaging the glass sheet with the sharp-edged tool without relative motion between the glass sheet and the sharp-edged tool after engaging the glass sheet with the sharp-edged tool causes the glass sheet to separate along the cutting line.

18. The apparatus of claim 17, wherein the heating element is embedded in a support positionable to engage a surface of the glass sheet.

19. The apparatus of claim 17, wherein the sharp edge of the sharp-edged tool comprises two opposed sharp edges, and the sharp-edged tool is engageable with the glass sheet such that the opposed sharp edges engage opposing surfaces of the glass sheet along the cutting line.

20. The apparatus of claim 17, wherein the sharp-edged tool comprises a sharp-edged pliers.

* * * * *